(12) United States Patent
Black, II

(10) Patent No.: US 11,072,365 B1
(45) Date of Patent: Jul. 27, 2021

(54) PNEUMATIC POWER STEERING SYSTEM

(71) Applicant: G.T. Airinject Inc., Jacksonville, FL (US)

(72) Inventor: Glen Black, II, Jacksonville, FL (US)

(73) Assignee: Foley Company, LLC, Prescott, WI (US)

( * ) Notice: Subject to any disclaimer, the term of this patent is extended or adjusted under 35 U.S.C. 154(b) by 0 days.

(21) Appl. No.: 16/949,444

(22) Filed: Oct. 29, 2020

(51) Int. Cl.
*B62D 5/09* (2006.01)
*B62D 5/12* (2006.01)

(52) U.S. Cl.
CPC ............... *B62D 5/09* (2013.01); *B62D 5/12* (2013.01)

(58) Field of Classification Search
CPC .................................. B62D 5/09; B62D 5/12
See application file for complete search history.

(56) References Cited

U.S. PATENT DOCUMENTS

| 2,855,065 | A | * | 10/1958 | Lucien | ...................... | B62D 5/08 |
| | | | | | | 180/437 |
| 4,624,336 | A | | 11/1986 | Eddy | | |
| 8,201,656 | B2 | * | 6/2012 | Archer | ...................... | B62D 3/12 |
| | | | | | | 180/428 |
| 8,393,434 | B2 | * | 3/2013 | Honzek | ...................... | B62D 3/12 |
| | | | | | | 180/440 |

FOREIGN PATENT DOCUMENTS

| CN | 201026911 Y | 2/2008 |
| CN | 201395163 Y | 2/2010 |
| CN | 201405919 Y | 2/2010 |
| GB | 821066 A | 9/1959 |
| GB | 1122015 A | 7/1968 |

* cited by examiner

*Primary Examiner* — Kevin Hurley
*Assistant Examiner* — Harold Eric Pahlck, III
(74) *Attorney, Agent, or Firm* — Dicke, Billig & Czaja, PLLC

(57) ABSTRACT

A pneumatic steering system includes a cylinder movable in relation to a through rod, steering tie rods coupled to the cylinder, a control valve that controls motion of the cylinder in relation to the through rod, a spring-biased pivoting actuator operably coupled to a steering linkage and to a control input of the control valve. The actuator is pivotally mounted to a structure attached to the cylinder. The control valve is attached to that structure. The steering linkage is an articulated assembly that transforms rotation of the steering column into pivoting movement of the actuator.

20 Claims, 11 Drawing Sheets

PNEUMATIC POWER STEERING SYSTEM

FIELD OF THE INVENTION

This invention relates generally to power steering, and, more particularly, to a pneumatic power steering system with a fixed through rod and movable cylinder that provides power assist.

BACKGROUND

A conventional steering system has four main parts: a steering column, a steering box, a steering linkage, and a steering knuckle. Added to the basic conventional steering system is a power assist system that makes it easier for the driver to steer the vehicle. Heretofore, power steering systems have been hydraulic, electrohydraulic, or electric.

Hydraulic power steering systems work by using a hydraulic system to multiply force applied to the steering wheel inputs to the vehicle's steered road wheels. A heavy and costly dedicated pump provides hydraulic pressure. The pump receives hydraulic fluid (power steering fluid) from a reservoir and supplies pressurized fluid to an actuator such as a double-acting hydraulic cylinder. The fluid may overheat and lose much of its lubricity and resistance to future overheating. Causes of overheating include pinched lines, low fluid levels, pump failure and hard driving. Additionally, over time the fluid entraps contaminants, including particles from seals, metal particles from plumbing and equipment, and environmental contaminants. Contaminated fluid can compromise performance, clog the power steering system and damage components such as bearings and seals.

Electric power steering use more than a just a motor. Complex and costly electronics, including a module containing drivers, signal generators and MOSFET switches that power and control the electric motor, a steering angle sensor that measures steering wheel position angle and rate of turn, and a Hi-Speed CAN bus on the vehicle for network communication of information, are used in such systems. It is impractical to incorporate these costly and complex electronics into certain vehicles.

Some vehicles include pneumatic pumps. In such vehicles, adding a hydraulic pump or electric motor and associated electronics for power assisted steering is inefficient. The electric motor and electronics increases complexity and cost while requiring a robust alternator or generator. A more powerful generator depletes engine power to meet the electric demands of the added motor and electronics. Likewise, a hydraulic pump consumes engine power and reduces efficiency, increases cost and complexity and increases weight. Problems associated with power steering fluid, as described above, also arise.

What is needed is an alternative power assist system for power steering. The system should obviate an electric pump, hydraulic pump and power steering fluid.

The invention is directed to overcoming one or more of the problems and solving one or more of the needs as set forth above.

SUMMARY OF THE INVENTION

To solve one or more of the problems set forth above, in an exemplary implementation of the invention, a pneumatic power steering system includes a source of compressed air, a directional control valve assembly fluidly coupled to a double acting cylinder with a through rod, a spring biased actuator coupled to a control shaft of the directional control valve assembly and also coupled to a linkage from a steering column. A piston is attached to the through rod, within the cylinder. The spring biased actuator pivots in proportion to rotation of the steering column. Pivoting of the spring biased actuator pushes or pulls the control shaft of the directional control valve assembly. The control shaft has three positions, a neutral position between an in position and an out position. In the neutral position, compressed air from the compressed air source enters the valve assembly and is directed to both sides of the piston, equally. Pushing or pulling of the control shaft causes movement of the cylinder of the double acting cylinder relative to the through rod by creating a pressure differential in the cylinder, with lower pressure on the side of the piston towards which the cylinder moves. Movement of the control shaft to the in-position causes the control valve assembly to bleed air from one side of the piston, the side to which the cylinder moves. Movement of the control shaft to the out-position causes the control valve assembly to bleed air from the other side of the piston. The spring of the spring biased actuator allows the control shaft to return to a neutral position when turning of the steering column ceases. Pivoting of the spring biased actuator compresses a spring in the actuator. When the steering wheel is returned to the straight position, the spring expands (de-compresses). Such expansion urges the actuator arm and control shaft to the center, the neutral position, where the valve assembly restores equal pressure on both sides of piston. In the neutral position, pressure on each side of the piston is equal. The cylinder, being coupled to the steering system, provides power assist.

In a non-limiting exemplary embodiment, a pneumatic power steering system according to principles of the invention includes a pneumatic valve assembly receiving compressed air from a compressed air source. A pneumatic cylinder is fluidly coupled to the pneumatic valve assembly. The pneumatic cylinder is a through-rod double-acting cylinder and includes a cylinder housing having a first end and a second end. The first rod end is opposite the second rod end. The first rod end extending from the first end. The second rod end extends from the second end. The first rod end and the second rod end are restrained from linear motion. Instead, the cylinder housing is movable linearly relative to the first rod end and the second rod end. The valve assembly controls motion of the cylinder housing relative to the first rod end and the second rod end. A first steering tie rod mount and a second steering tie rod mount are coupled (connected directly or indirectly) to the cylinder housing. A first tie rod extends from the first steering tie rod mount to a first steering knuckle. A second tie rod extends from the second steering tie rod mount to the second steering knuckle.

The valve assembly includes a control input (an input mechanism for controlling operation of the valve assembly). The control input is movable between a first position and at least one other position. In the first position the valve assembly causes motion of the cylinder housing towards the first rod end. The at least one other position may include a second position and a third position. In the third position the valve assembly causes motion of the cylinder housing towards the second rod end. In the second position the valve assembly causing the cylinder housing to cease motion relative to the first rod end and the second rod end. An actuator assembly may be operably coupled to the control input of the valve assembly. The actuator assembly is pivotally mounted (directly or indirectly) to the cylinder housing. The control input of the valve assembly may include a control shaft. The actuator assembly may be operably coupled to the control input of the valve assembly by a coupling extending from the actuator assembly to the control shaft, whereby pivoting motion of the actuator assembly causes motion of the control shaft. The actuator assembly may also include an actuator arm. The actuator arm may include a steering link mount. An articulated steering linkage assembly (i.e., a multicomponent assembly connecting the output of a steering column to the steering link mount and consisting of segments or components united by joints, which may be movable joints) may be connected to the steering link mount and to a steering column (a shaft that rotates as the steering wheel or handlebar is rotated). The actuator assembly may also include a cavity containing a compression spring. The compression spring is compressible in the cavity. The cavity includes a plurality of adjoining slots. A pair of spaced apart uprights extend from the plate and are aligned with opposite ends of the compression spring through two of the plurality of adjoining slots. Thus, motion of the steering column causes related motion of the actuator assembly.

The first steering tie rod mount and the second steering tie rod mount may be formed in a plate (e.g., a power steering plate). The plate may be attached (directly or indirectly) to the cylinder housing. The valve assembly may be attached to the plate. The actuator assembly may be pivotally mounted to the plate.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

An exemplary pneumatic steering system according to principles of the invention includes a pneumatic cylinder movable in relation to a through-rod, steering tie rods coupled to the cylinder, a control valve assembly that controls motion of the cylinder in relation to the through-rod, a spring-biased pivoting actuator operably coupled to a steering linkage and to a control input of the control valve. The steering linkage is an articulated assembly that transforms rotation of the steering column to pivoting movement of the actuator.

A pneumatic power steering system according to principles of the invention requires pressurized gas from a source of pressurized gas, preferably a source of pressurized air. The source may comprise a tank containing pressurized air and/or a compressor that supplies compressed air to the tank or directly to the power steering system. The compressor may be driven by an electric motor or an internal combustion engine. In a vehicle equipped with an internal combustion engine, a belt and pulley coupled to the engine output may drive the compressor. The particular source of compressed air is not important, provided that source provides a sufficient volume of pressurized air at a pressure suitable for the valve assembly and pneumatic cylinder to provide power assist.

Figure 1:
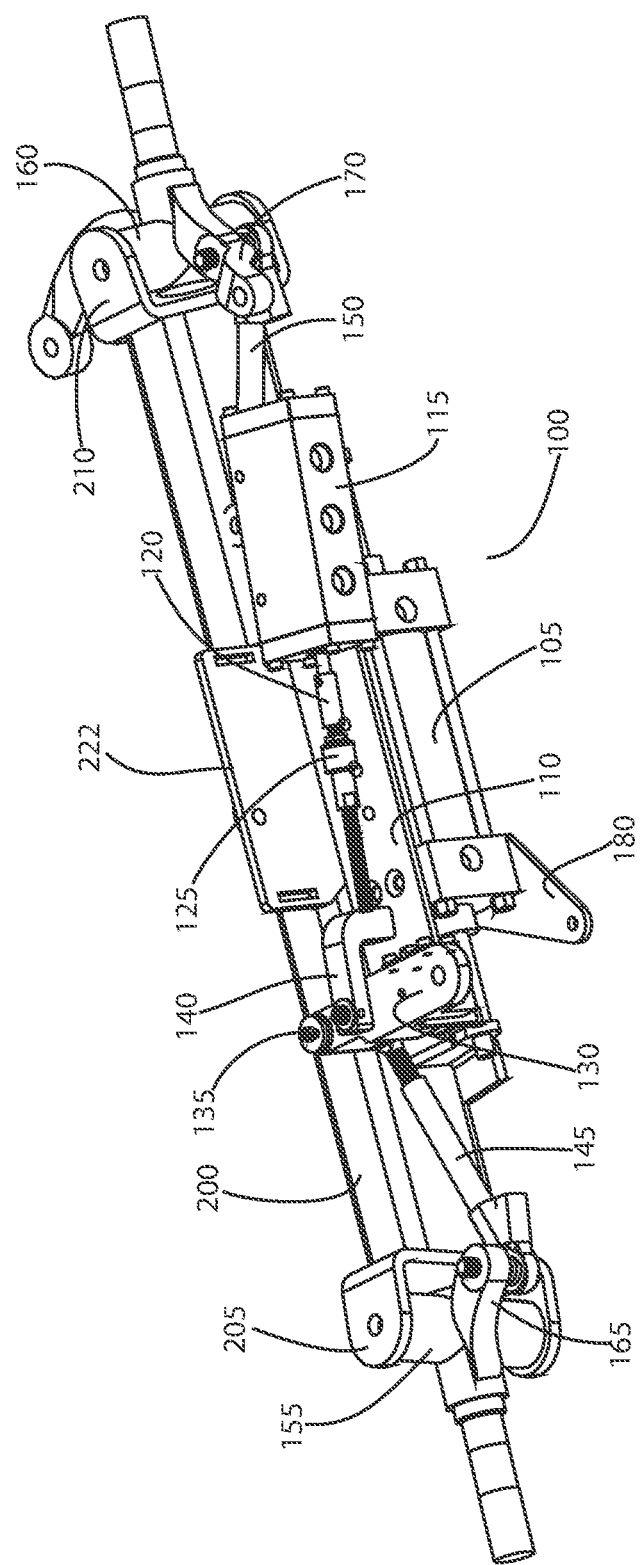
FIG. 1 is a perspective view of an exemplary pneumatic power assist steering system connected to an axle assembly according to principles of the invention.
Figure 2:
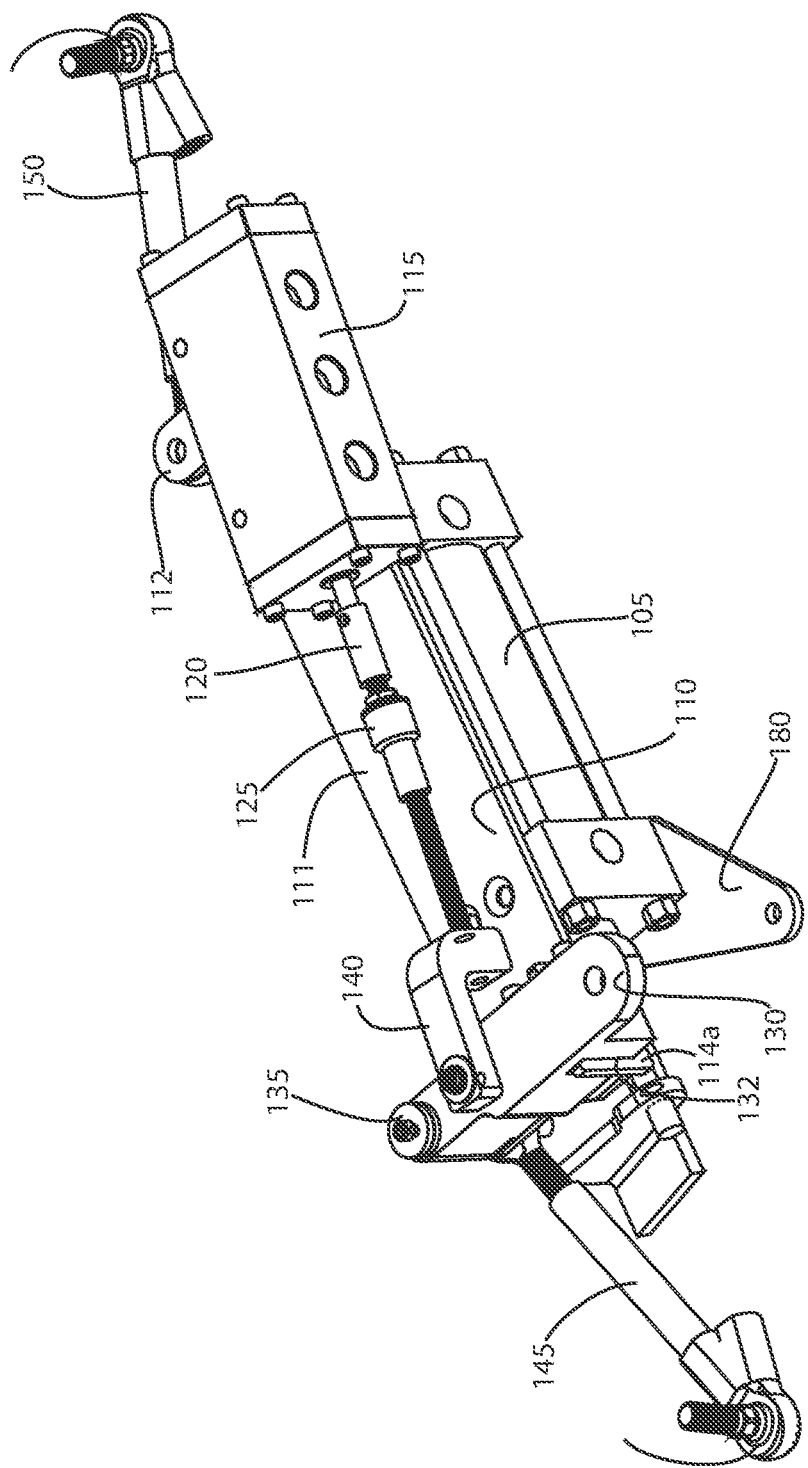
FIG. 2 is a perspective view of an exemplary pneumatic power assist steering system according to principles of the invention.
Figure 3:
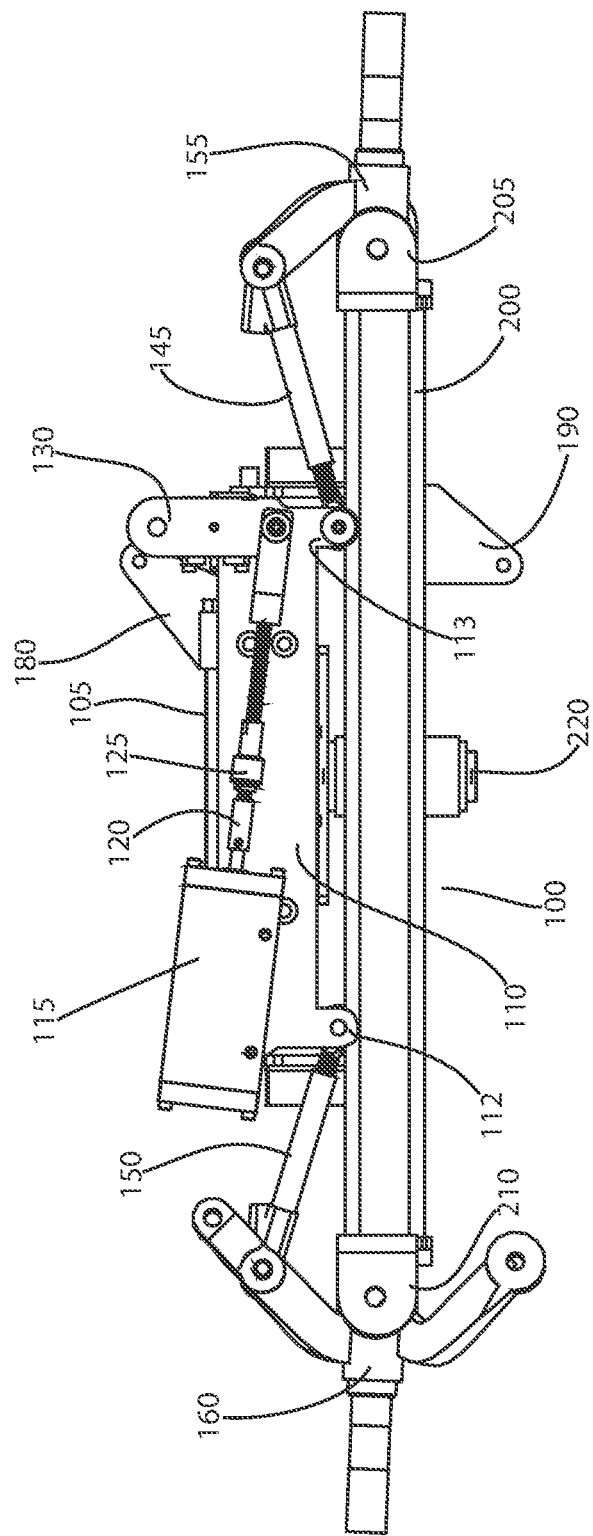
FIG. 3 is a plan view of an exemplary pneumatic power assist steering system connected to an axle assembly according to principles of the invention.
Figure 10:
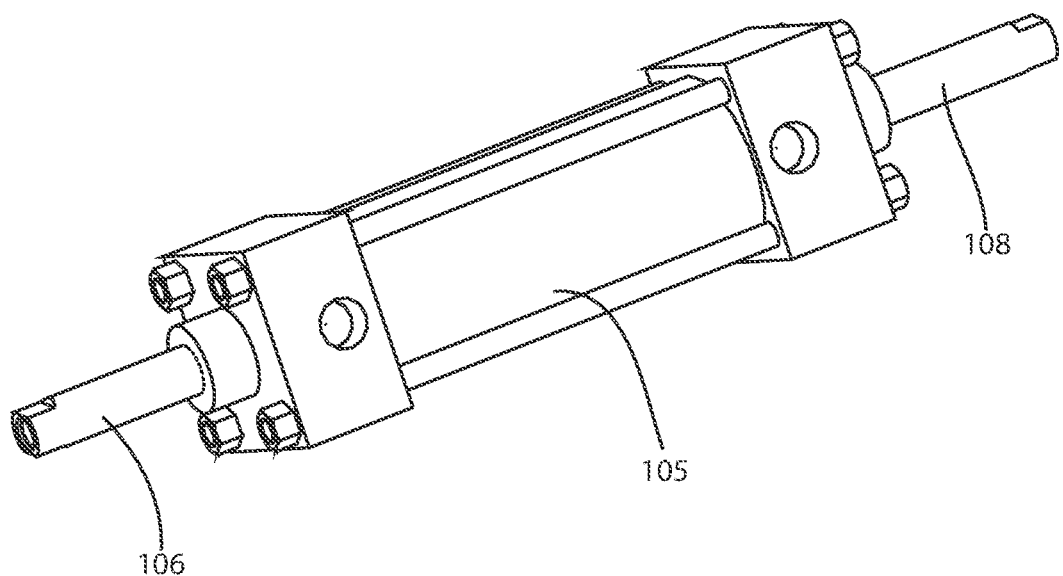
FIG. 10 is a perspective view of an exemplary double acting cylinder with a through rod for an exemplary pneumatic power assist steering system according to principles of the invention.
Figure 11:
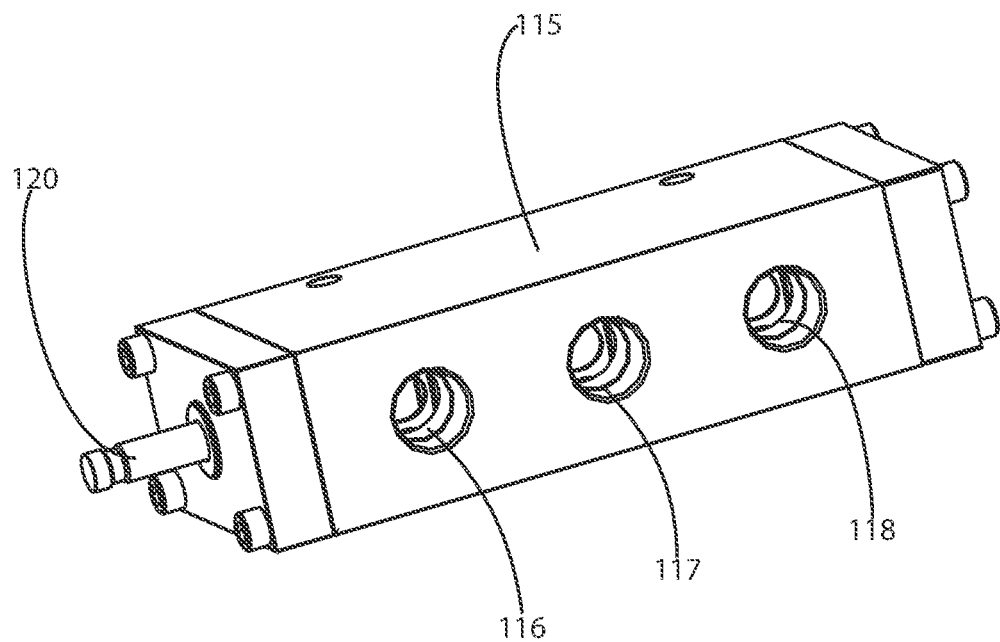
FIG. 11 is a perspective view of an exemplary valve assembly for an exemplary pneumatic power assist steering system according to principles of the invention.

Referring to FIGS. 1-3, an exemplary pneumatic power assist steering system 100 connected to an axle assembly 200 according to principles of the invention, is conceptually illustrated. A double-ended (or through-rod) cylinder 105 (pneumatic cylinder), which includes a plurality of ports, is fluidly coupled to ports 116-118 of a control valve assembly 115 (FIGS. 10-11). The valve assembly 115 is preferably mounted in fixed relation to the cylinder 105. The fluid couplings (e.g., hoses) are omitted from the drawings for clarity. A source of pressurized air supplies pressurized air to the control valve assembly 115. The cylinder 105 contains a piston, to which a rod, i.e., the through-rod, is attached. The rod that extends through the cylinder 105, has two ends, end 106 and end 108. In the exemplary implementation, the ends 106, 108 are fixed relative to the axle assembly 200 (e.g., between brackets extending from the axle assembly) and the cylinder 105 moves linearly relative to the axle assembly 200. As known in the art of pneumatic cylinders, the piston provides a seal within the cylinder, and that seal may move relative to cylinder in response to a pressure differential. If the pressure on one side of the piston is less than on the opposite side, the cylinder 105 will move relative to the rod towards the side with the lower pressure. If the pressure on both sides of the piston is equal, the cylinder 105 will not move relative to the rod.

The difference between the pressures on each side of the piston in the cylinder 105, the pressure differential, is controlled by the control valve assembly 115. The control valve assembly 115 controls the pressure differential in the cylinder 105, and therefore controls motion of the cylinder 105 relative to the rod. The control valve assembly 115 may supply compressed air to each side of the piston and may bleed (i.e. evacuate) compressed air from each side of the piston. Compressed air may be bled from one side, the other side, or both sides. Compressed air may be introduced into one side, the other side, or both sides. The position of the control input of the valve assembly 115 determines whether a side is bled, supplied with compressed air, or sealed. Bled air is evacuated through the valve assembly 115 to the atmosphere. In one exemplary embodiment, the valve assembly 115 includes a control shaft 120 with three positions (e.g., an out position, a neutral position and in-position). The positions (in, out and neutral) are used herein to denote 3 distinct positions, for convenience of reference, and may also be referred to as first, second and third positions, or as distinct positions using other nomenclature. When the control shaft 120 is in the out position, the valve assembly 115 bleeds air from one side of the piston in the cylinder 105. When the control shaft 120 is in the in-position, the valve assembly 115 bleeds air from the other side of the piston in the cylinder 105. When the control shaft 120 is in the neutral position, the valve assembly 115 supplies compressed air unless and until the pressure differential is zero and a threshold pressure is maintained.

An actuator assembly 300 (FIGS. 5-7) with an actuator arm 130 is pivotally mounted to a cylinder housing mount referred to as a power steering plate 110. The valve assembly 115 may also be mounted to the power steering plate 110, spaced apart from the actuator assembly 300. The actuator assembly 300 pivots about a spindle 135. The spindle 135 is a shaft that defines an axis of pivoting movement. The end of the actuator arm 130 that is opposite the spindle 135, connects to a linkage couple to a steering column. Thus, steering rotation of a steering wheel causes pivoting motion of the actuator arm 130 about the spindle. The actuator assembly 300 includes a pin 355 that is pivotally coupled to an elbow 140 that connects the actuator assembly 300 to a linkage 125 that links the actuator assembly 300 to the control shaft 120 of the control valve assembly 115. Thus, pivoting motion of the actuator arm 130, causes movement of the control shaft 120. Such movement of the control shaft 120 causes the control valve assembly 115 to control the pressure differential in the cylinder 105. Control of the pressure differential in the cylinder 105 controls relative movement (if any) of the cylinder 105.

Figure 5:
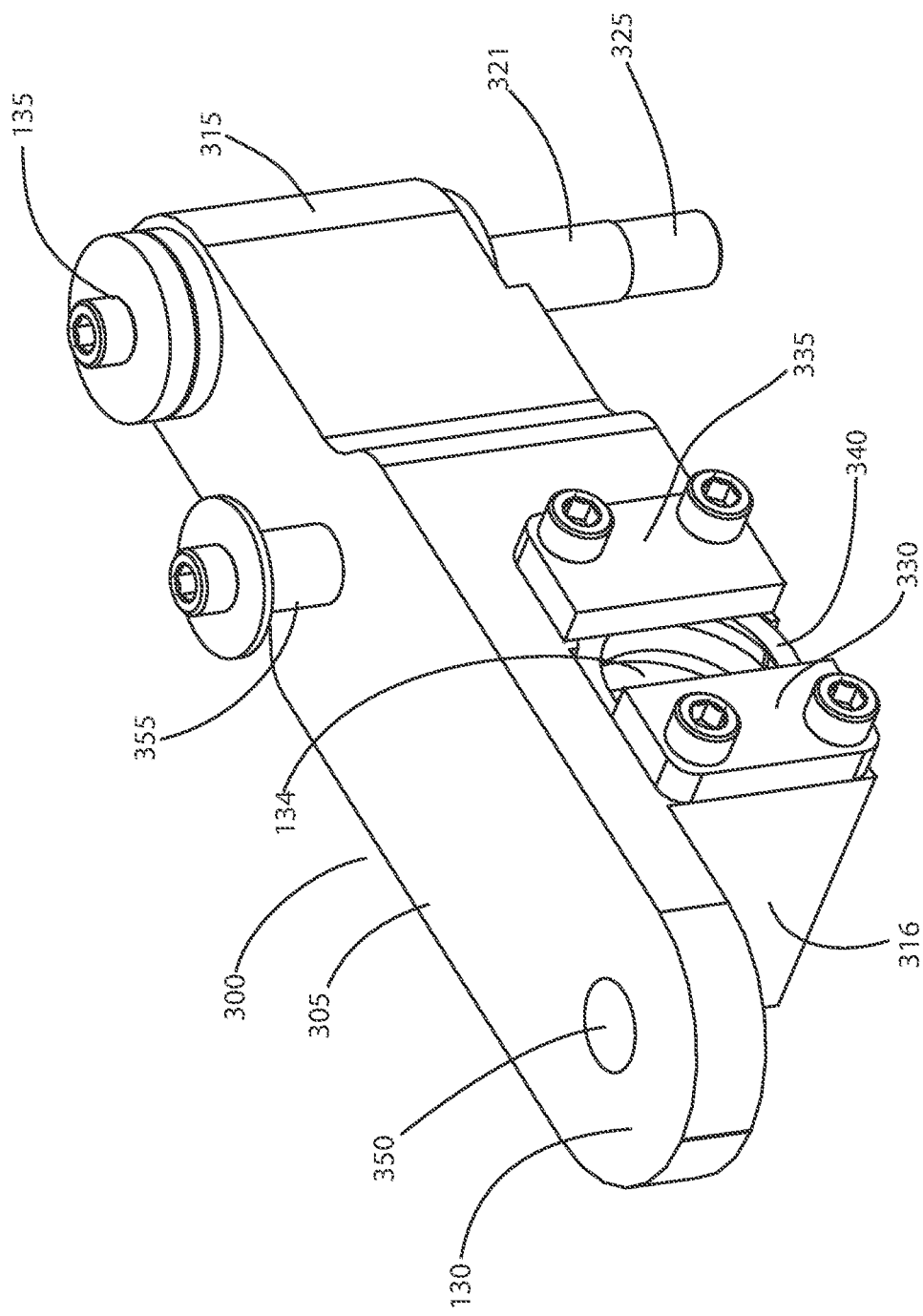
FIGS. 5-7 are perspective views of an exemplary spring-biased actuator assembly for an exemplary pneumatic power assist steering system according to principles of the invention.
Figure 6:
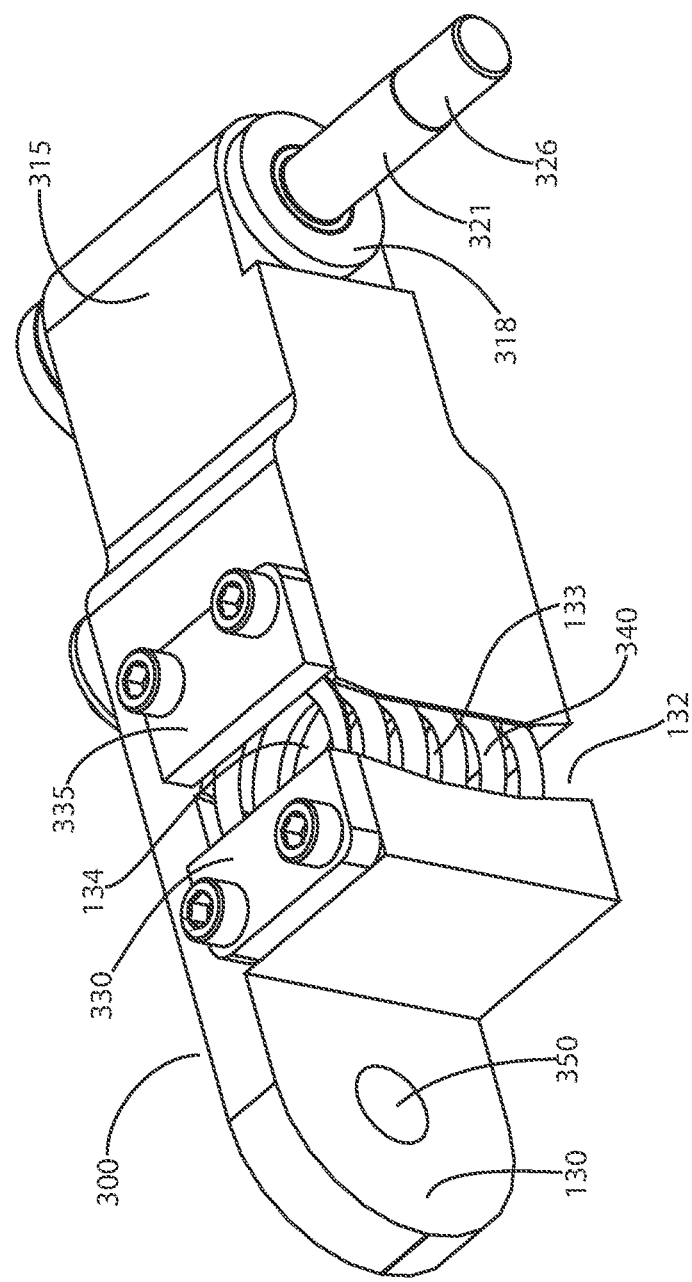
Figure 7:
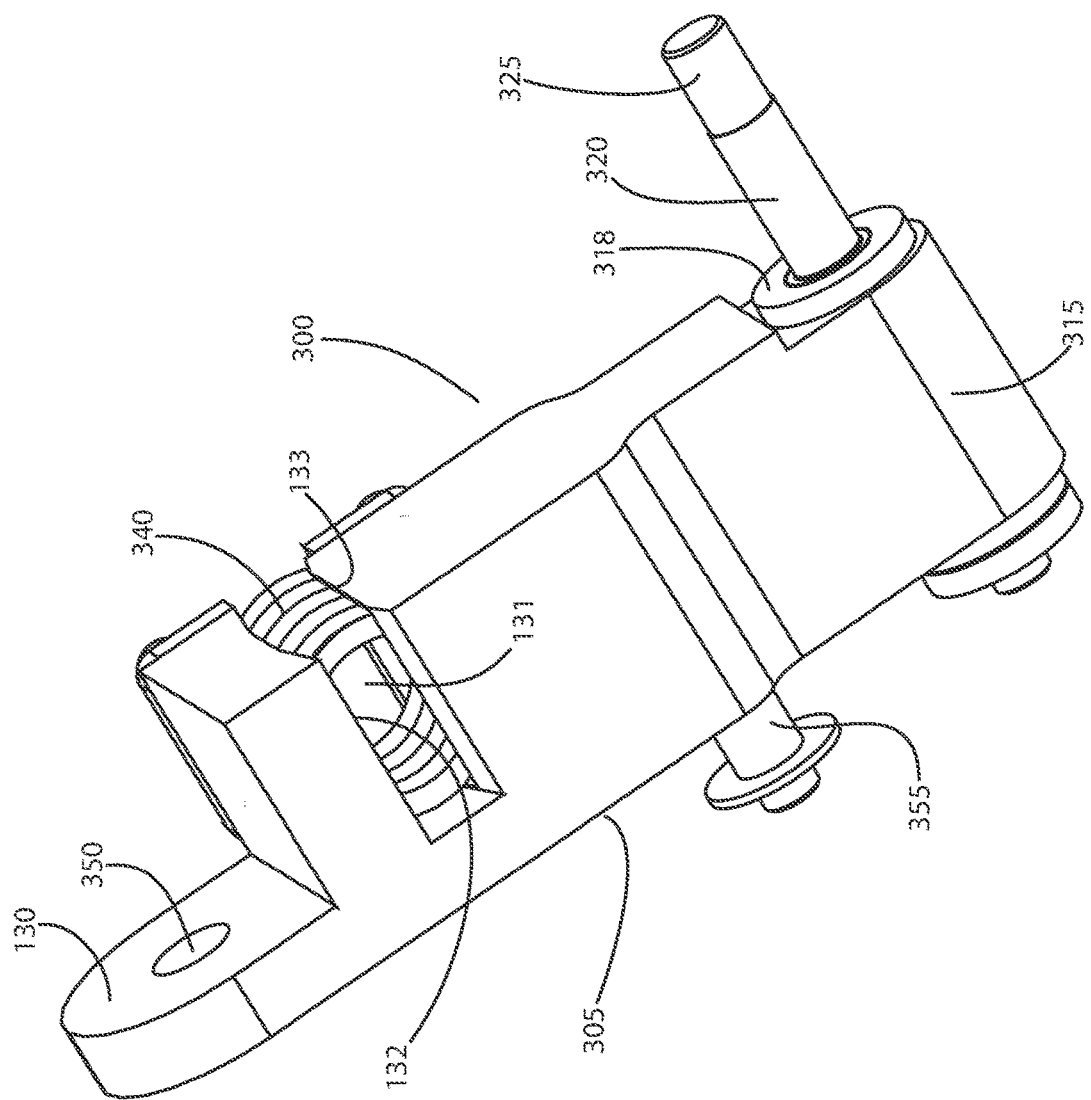
Figure 9:
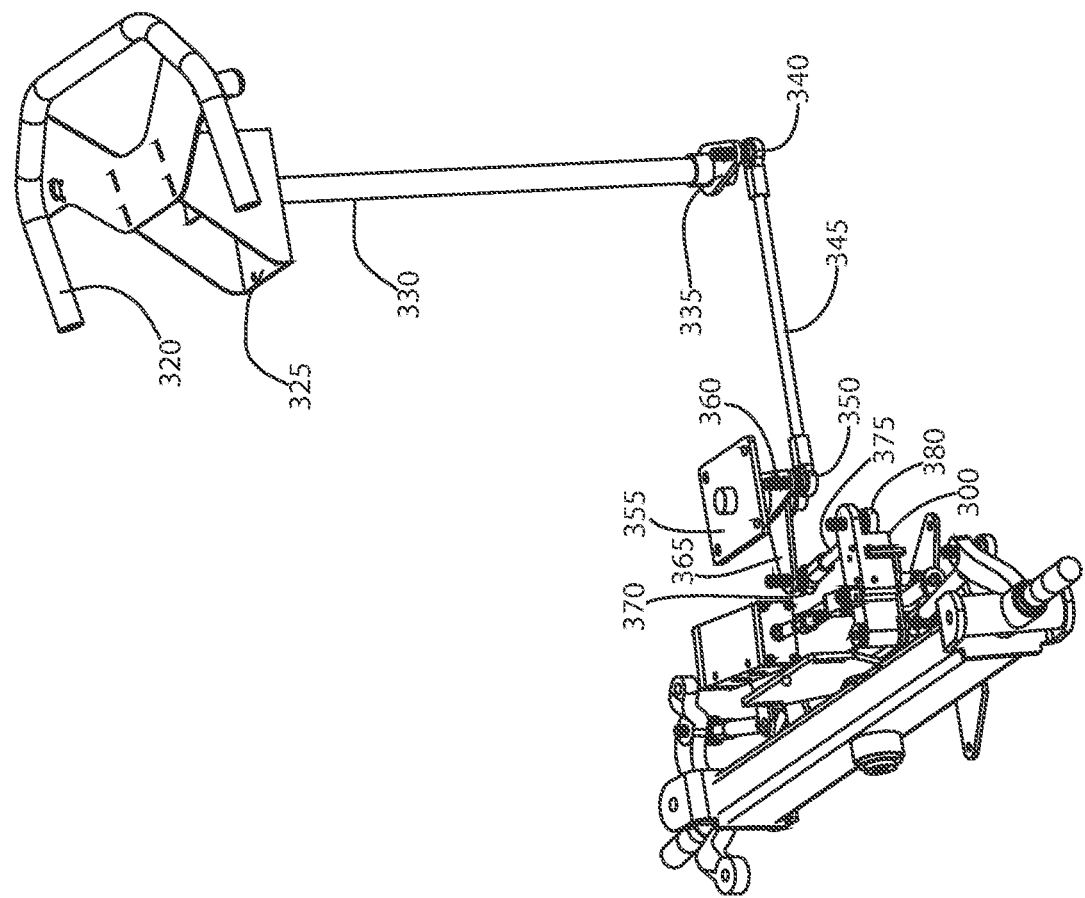
FIG. 9 is a perspective view of an exemplary steering linkage for an exemplary pneumatic power assist steering system according to principles of the invention.

A non-limiting example of a steering linkage for a rear wheel steered vehicle is conceptually illustrated in FIG. 9. A steering wheel or handlebar 320 is mounted to a mount 325. A shaft 330 or steering column extends from the handlebar 320. A lever arm 335 at the distal end of the shaft 330 is connected to a ball joint 340 of a first steering link 345. A pivoting lever arm assembly includes a first lever arm 360 fixed at a right angle to a second lever arm 365. The lever arm assembly pivots relative to a mounting plate 355 which may be attached to a frame or similar components. The second arm 365 is connected by a second steering link 375, with ball joints 370, 380, to the hole 350 in the actuator arm 130 (FIGS. 5-7). Steering rotation of the handlebar causes movement of the linkage elements, which causes the actuator assembly 300 to pivot about spindle 135.

The invention is not limited to the illustrated valve assembly 115. Other valve assemblies capable of controlling the pressure differential in a power assist pneumatic cylinder may be utilized without departing from the scope of the invention. Such other valve assemblies may include other mechanically actuated valve assemblies, with the linkage between the actuator arm 130 and the control input of the valve assembly being adjusted for the particular valve assembly. The linkage provides a mechanical coupling between the actuator arm 130 and the control input of the valve assembly. Alternatively, such other valve assemblies may include an electrically operated control valve. A sensor may detect pivoting motion of the actuator arm and supply input control signals to the electrically operated control valve. By way of example and not limitation, such a sensor may be a rotary motion position sensor, a hall effect sensor with one or more magnets attached to the actuator arm 130, a rotary encoder, or an angular rate sensor.

Figure 8:
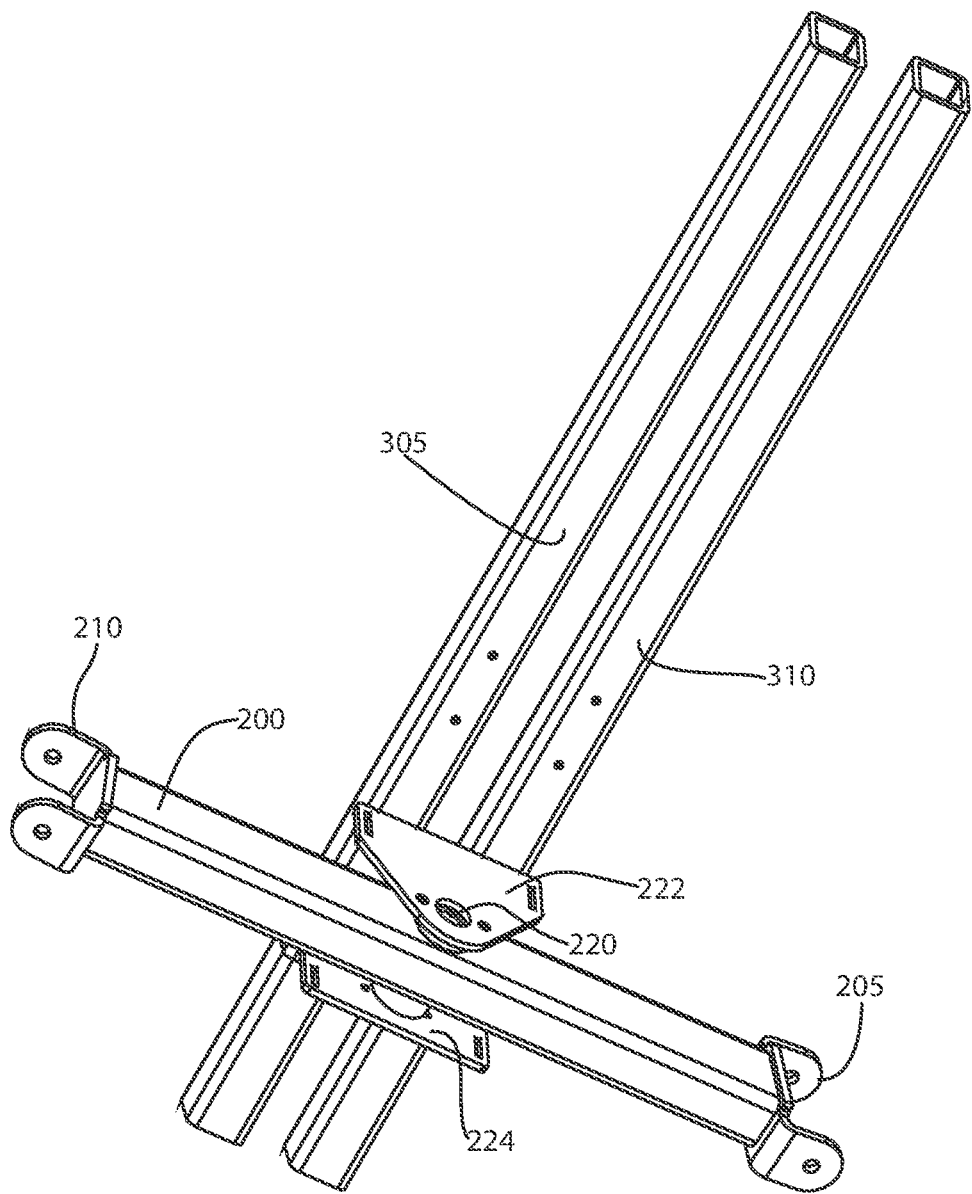
FIG. 8 is a perspective view of an exemplary axle assembly pivotally mounted to frame components for an exemplary pneumatic power assist steering system according to principles of the invention.

Knuckle brackets 205, 210 are provided at opposite ends of the axle 200. A steering knuckle 155, 160 is pivotally mounted in each knuckle bracket 205, 210. With reference to FIG. 8, the axle 200 is pivotally mounted between opposed plates 222, 224 with a tubular shaft 220 extending between the plates 222, 224. The plates are attached (e.g., bolted) to frame tubes 305, 310. A bearing may be provided in the axle 200 to facilitate rotation about the shaft 220. The principles of the invention are not limited to the specific axle and steering knuckles illustrated in the figures. Axles and knuckles having other configurations may be steered using a power assist system according to principles of the invention.

In the exemplary embodiment, tie rods 145, 150 couple the arm 165, 170 of each knuckle 155, 160 to the power steering plate 110. As the cylinder 105 moves relative to the rod 106, 108, the power steering plate 110 attached to the cylinder 105 moves. As the power steering plate 110 attached to the cylinder 105 moves, the tie rods 145, 150 are moved. One tie rod is pulled while the other tie rod is pushed. Such movement of the tie rods 145, 150 causes pivoting rotation of the steering knuckles 155, 160 about the knuckle brackets 205.

Optionally, to stabilize the cylinder 105 and axle 200, radius arm mounts 180, 190 are provided. Each radius arm may be connected with a rubber or solid bushing to the radius arm mount at one end and to the frame, chassis or unibody of the vehicle at the other end. Thus, the radius arms allow the axle 200 and cylinder to move through their range of travel, while resisting motion in other directions or beyond the range of travel. While the invention may be used with radius arm stabilizers, the invention is not limited to use with any particular radius arm stabilizers or any radius arm stabilizers.

Figure 4:
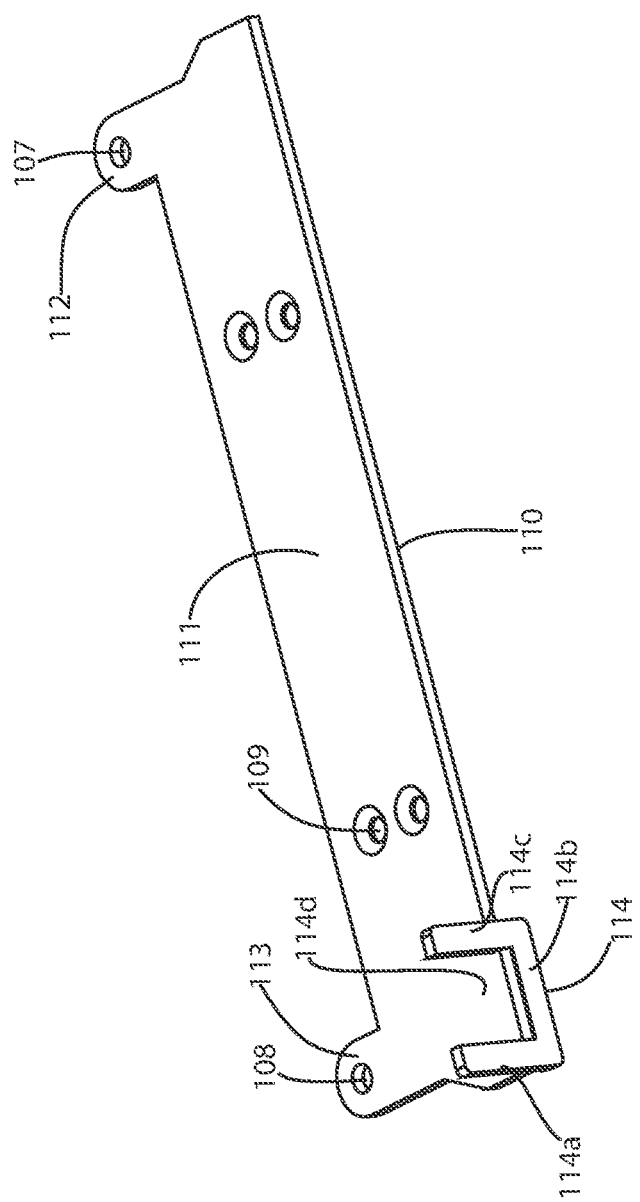
FIG. 4 is a perspective view of an exemplary cylinder housing mount for an exemplary pneumatic power assist steering system according to principles of the invention.

FIG. 4 conceptually illustrates an exemplary cylinder housing mount, i.e., power steering plate 110, for an exemplary pneumatic power assist steering system according to principles of the invention. The power steering plate 110 attaches to the cylinder 105 (i.e., the exterior of the cylinder housing in which the cylinder is contained). As the cylinder 105 moves, so does the power steering plate 110 move. The power steering plate 110 includes holes 109 in the body 111 for bolting the power steering plate 110 to the cylinder 105. A pair of tabs 112, 113 with tie rod mounting holes 107, 108, are provided along an edge, at opposite ends of the body 111. The pair of tabs are aligned with the plane of the body 111 of the power steering plate 110.

An actuator bracket 114 extends perpendicular to the plane of the body 111 of the power steering plate 110. The bracket 114 extends from an edge opposite to the edge from which the tab 113 extends. The bracket includes a base segment 114b with two ends, and an upright segment 114a, 114c extending upwardly from each end, to form a U-shaped structure with a gap 114d between the uprights 114a, 114c. The bracket 114 engages a spring 340 (FIGS. 5-7) in the actuator assembly 300. The bracket 114 is sized, shaped and configured for the uprights 114a, 114c to occupy opposite side slots 132, 134 of the actuator assembly 300, while the base 114b occupies the bottom slot 133 of the actuator assembly 300. The gap 114d is at least equal to the length of the spring 340 in the actuator assembly 300 before the spring 340 is compressed by an upright 114a, 114c. The thickness of each upright 114a, 114c is less than the width of each opposite side slot 132, 134.

FIGS. 5-7 conceptually illustrates an exemplary spring-biased actuator assembly 300 for an exemplary pneumatic power assist steering system according to principles of the invention. A spindle 135 with a medial portion 321 extend through a first end 315 of the actuator assembly 300 and engages the mounting hole 108 in the power steering plate 110. The assembly includes a surface 305 with an arm 130, with a hole 350 for coupling a steering linkage, defining a second end 316 of the actuator assembly 300 opposite the first end 315. The actuator assembly 300 may pivot about the spindle 135 relative to the power steering plate 110. A distal portion 326 of the spindle 135 extends through the mounting hole 108, for engagement by an end of the tie rod 145. While the medial portion 321 of the spindle 135 engages the mounting hole 108, the slots 132-134 of the actuator assembly 300 are flanked by the uprights 114a, 114c. A pair of removable plates 330, 335 provide access to a spring compartment 131 in the bottom 310 of the actuator assembly 300.

The actuator assembly 300 also includes a pin 355 that is pivotally coupled to an elbow 140. The elbow connects the actuator assembly 300 to a linkage 125. The linkage 125 links the actuator assembly 300 to the control shaft 120 of the control valve assembly 115. Steering motion causes pivoting motion of the actuator arm 130. Pivoting motion of the actuator arm 130 causes movement of the control shaft 120. Such movement of the control shaft 120 causes the control valve assembly 115 to control the pressure differential in the cylinder 105. Control of the pressure differential in the cylinder 105 controls relative movement (if any) of the cylinder 105. Concomitantly, pivoting motion of the actuator arm 130 causes the spring 340 to abut one of the uprights 114a, 114c. Interaction between the spring 340 and the upright 114a, 114c, cause the spring 340 to compress. The compressed spring When the steering wheel is held straight, the compression of the spring 340 ceases and the spring 340 returns to an uncompressed state. Upon returning to an uncompressed state, the spring 340 urges the control shaft 120 into a neutral position. When the control shaft 120 is in a neutral position, the valve assembly 115 reduces any pressure differential in the cylinder 105 to zero.

FIG. 9 is a perspective view of an exemplary steering linkage for an exemplary pneumatic power assist steering system according to principles of the invention; and FIG. 10 is a perspective view of an exemplary double acting cylinder with a through rod for an exemplary pneumatic power assist steering system according to principles of the invention; and FIG. 11 is a perspective view of an exemplary valve assembly for an exemplary pneumatic power assist steering system according to principles of the invention.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A pneumatic power steering system comprising:
   a pneumatic valve assembly receiving compressed air from a compressed air source;
   a pneumatic cylinder fluidly coupled to the pneumatic valve assembly, the pneumatic cylinder being a through-rod double-acting cylinder and including a cylinder housing having a first end and a second end, the through-rod having a first rod end being opposite a second rod end, the first rod end extending from the first end, the second rod end extending from the second end, the first rod end and the second rod end being restrained from linear motion, and the cylinder housing being movable linearly relative to the first rod end and the second rod end, the pneumatic valve assembly controlling motion of the cylinder housing relative to the first rod end and the second rod end; and
   a first steering tie rod mount and a second steering tie rod mount, the first steering tie rod mount and the second steering tie rod mount being coupled to the cylinder housing.

2. The pneumatic power steering system of claim 1, the pneumatic valve assembly further comprising a control input, the control input being movable between a first position and at least one other position, and in the first position the pneumatic valve assembly causing motion of the cylinder housing towards the first rod end.

3. The pneumatic power steering system of claim 1, further comprising an actuator assembly, the actuator assembly being operably coupled to the control input of the pneumatic valve assembly, and the actuator assembly being pivotally mounted to the cylinder housing.

4. The pneumatic power steering system of claim 2, the at least one other position including a second position and a third position, and in the third position the pneumatic valve assembly causing motion of the cylinder housing towards the second rod end, and in the second position the pneumatic valve assembly causing the cylinder housing to cease motion relative to the first rod end and the second rod end.

5. The pneumatic power steering system of claim 2, the first steering tie rod mount and the second steering tie rod mount being formed in a plate, the plate being attached to the cylinder housing.

6. The pneumatic power steering system of claim 5, the pneumatic valve assembly being attached to the plate.

7. The pneumatic power steering system of claim 5, further comprising an actuator assembly, the actuator assembly being operably coupled to the control input of the pneumatic valve assembly, and the actuator assembly being pivotally mounted to the plate.

8. The pneumatic power steering system of claim 7, the control input of the pneumatic valve assembly comprising a control shaft, and the actuator assembly being operably coupled to the control shaft of the pneumatic valve assembly by a coupling extending from the actuator assembly to the control shaft, whereby pivoting motion of the actuator assembly causes motion of the control shaft.

9. The pneumatic power steering system of claim 7, the actuator assembly including an actuator arm, the actuator arm including a steering link mount.

10. The pneumatic power steering system of claim 7, the actuator assembly including a cavity containing a compression spring, the compression spring being compressible in the cavity, the cavity including a plurality of adjoining slots, a pair of spaced apart uprights extending from the plate and aligned with opposite ends of the compression spring through two of the plurality of adjoining slots.

11. A pneumatic power steering system comprising
a pneumatic valve assembly receiving compressed air from a compressed air source;
a pneumatic cylinder fluidly coupled to the pneumatic valve assembly, the pneumatic cylinder being a through-rod double-acting cylinder and including a cylinder housing having a first end and a second end, the through-rod having a first rod end being opposite a second rod end, the first rod end extending from the first end of the cylinder housing, and the second rod end extending from the second end of the cylinder housing, and the first rod end and the second rod end being restrained from linear motion, and the cylinder housing being movable linearly relative to the first rod end and the second rod end, the pneumatic valve assembly controlling motion of the cylinder housing relative to the first rod end and the second rod end; and
a first steering tie rod mount and a second steering tie rod mount, the first steering tie rod mount and the second steering tie rod mount being coupled to the cylinder housing, and a first tie rod extending from the first steering tie rod mount to a first steering knuckle, and a second tie rod extending from the second steering tie rod mount to a second steering knuckle.

12. The pneumatic power steering system of claim 11, the pneumatic valve assembly further comprising a control input, the control input being movable between a first position and at least one other position, and in the first position the pneumatic valve assembly causing motion of the cylinder housing towards the first rod end.

13. The pneumatic power steering system of claim 11, further comprising an actuator assembly, the actuator assembly being operably coupled to the control input of the pneumatic valve assembly, and the actuator assembly being pivotally mounted to the cylinder housing.

14. The pneumatic power steering system of claim 12, the at least one other position including a second position and a third position, and in the third position the pneumatic valve assembly causing motion of the cylinder housing towards the second rod end, and in the second position the pneumatic valve assembly causing the cylinder housing to cease motion relative to the first rod end and the second rod end.

15. The pneumatic power steering system of claim 12, the first steering tie rod mount and the second steering tie rod mount being formed in a plate, the plate being attached to the cylinder housing.

16. The pneumatic power steering system of claim 15, the pneumatic valve assembly being attached to the plate.

17. The pneumatic power steering system of claim 15, further comprising an actuator assembly, the actuator assembly being operably coupled to the control input of the pneumatic valve assembly, and the actuator assembly being pivotally mounted to the plate.

18. The pneumatic power steering system of claim 17, the control input of the pneumatic valve assembly comprising a control shaft, and the actuator assembly being operably coupled to the control shaft of the pneumatic valve assembly by a coupling extending from the actuator assembly to the control shaft, whereby pivoting motion of the actuator assembly causes motion of the control shaft.

19. The pneumatic power steering system of claim 17, the actuator assembly including an actuator arm, the actuator arm including a steering link mount, an articulated steering linkage assembly connected to the steering link mount and to a steering column.

20. The pneumatic power steering system of claim 17, the actuator assembly including a cavity containing a compression spring, the compression spring being compressible in the cavity, the cavity including a plurality of adjoining slots, a pair of spaced apart uprights extending from the plate and aligned with opposite ends of the compression spring through two of the plurality of adjoining slots.

\* \* \* \* \*